United States Patent
Krishnamoorthy et al.

(10) Patent No.: US 9,860,764 B2
(45) Date of Patent: Jan. 2, 2018

(54) CHANNEL ESTIMATION FOR A SUBSET OF RESOURCE ELEMENTS OF A RESOURCE BLOCK

(71) Applicant: Telefonaktiebolaget L M Ericsson (publ), Stockholm (SE)

(72) Inventors: Aravindh Krishnamoorthy, Nuremberg (DE); Rainer Bachl, Nuremberg (DE); Thomas Wagner, Schwabach (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 74 days.

(21) Appl. No.: 14/889,961

(22) PCT Filed: May 10, 2013

(86) PCT No.: PCT/EP2013/059734
§ 371 (c)(1),
(2) Date: Nov. 9, 2015

(87) PCT Pub. No.: WO2014/180510
PCT Pub. Date: Nov. 13, 2014

(65) Prior Publication Data
US 2016/0127922 A1    May 5, 2016

(51) Int. Cl.
*H04B 7/00* (2006.01)
*H04W 24/02* (2009.01)
(Continued)

(52) U.S. Cl.
CPC ........... *H04W 24/02* (2013.01); *H04L 25/022* (2013.01); *H04L 25/0232* (2013.01);
(Continued)

(58) Field of Classification Search
CPC ..... H04W 28/16; H04W 28/18; H04W 28/20; H04W 28/24; H04W 28/26
(Continued)

(56) References Cited

U.S. PATENT DOCUMENTS

| | | | |
|---|---|---|---|
| 7,599,453 B2 | 10/2009 | Wilhelmsson | |
| 8,064,507 B1 * | 11/2011 | Cheng | H04B 7/01 375/224 |

(Continued)

FOREIGN PATENT DOCUMENTS

WO    WO 2012/041337 A1    4/2012

OTHER PUBLICATIONS

International Search Report, PCT/EP2013/059734, dated Feb. 6, 2014, 3 pages.
(Continued)

*Primary Examiner* — Dmitry H Levitan
(74) *Attorney, Agent, or Firm* — Sage Patent Group

(57) ABSTRACT

A technique for performing channel estimation for a wireless communication channel is provided. A determining circuit determines a channel condition for the wireless communication channel. A filtering circuit applies an estimation filter to reference signals transmitted on the wireless communication channel. The filter estimates coefficients for a subset of Resource Elements transmitted on the wireless communication channel. The subset is chosen depending on the determined channel condition. An interpolating circuit interpolates the estimated coefficients for Resource Elements that are not included in the subset.

21 Claims, 6 Drawing Sheets

(51) Int. Cl.
*H04L 25/02* (2006.01)
*H04W 72/04* (2009.01)
*H04L 25/03* (2006.01)
*H04L 27/26* (2006.01)
*H04B 7/0413* (2017.01)

(52) U.S. Cl.
CPC ......... *H04W 72/044* (2013.01); *H04B 7/0413* (2013.01); *H04L 25/0222* (2013.01); *H04L 25/03159* (2013.01); *H04L 25/03891* (2013.01); *H04L 27/2647* (2013.01); *H04L 2025/03414* (2013.01)

(58) Field of Classification Search
USPC ................ 370/310, 329, 330, 431, 464, 465
See application file for complete search history.

(56) References Cited

U.S. PATENT DOCUMENTS

| | | | |
|---|---|---|---|
| 8,121,206 B2 | 2/2012 | Lee et al. | |
| 8,553,594 B2* | 10/2013 | Baum | H04L 5/0007 370/310 |
| 8,873,504 B2* | 10/2014 | Zancho | H04L 25/0212 370/232 |
| 8,942,079 B2* | 1/2015 | Han | H04L 5/0048 370/204 |
| 2003/0026360 A1 | 2/2003 | Ramasubramanian et al. | |
| 2011/0216842 A1 | 9/2011 | Zhang et al. | |
| 2012/0147761 A1* | 6/2012 | Zhang | H04L 25/0234 370/252 |
| 2014/0204781 A1* | 7/2014 | Horvat | H04W 24/00 370/252 |

OTHER PUBLICATIONS

Written Opinion of the International Searching Authority, PCT/EP2013/059734.

3GPP, Technical Specification, "3rd Generation Partnership Project; Technical Specification Group Radio Access Network; Evolved Universal Terrestrial Radio Access (E-UTRA); Physical layer procedures (Release 11)", 3GPP TS 36.213 V11.2.0 (Feb. 2013), 173 pp.
3GPP, Technical Specification, "3rd Generation Partnership Project; Technical Specification Group Radio Access Network; Evolved Universal Terrestrial Radio Access (E-UTRA); Physical Channels and Modulation (Release 11)", 3GPP TS 36.211 V11.1.0 (Dec. 2012), 108 pp.
Anthony, "LTE: Der Mobilfunk der Zukunft—Reference Signals and Channel Estimation," Nov. 25, 2009, Retrieved from the Internet: URL:http://www.lmk.int.de/fileadmin/Lehre/Seminar09/Ausarbeitungen/Ausarbeitung_Leumaleu.pdf.
Arslan et al., "Doppler Spread Estimation for Wireless Mobile Radio Systems", *2000 IEEE Wireless Communications and Networking Conference*, Sep. 23-28, 2000, pp. 1075-1079.
ETSI, "LTE: Evolved Universal Terrestrial Radio Access (E-UTRA); Base Station (BS) radio transmission and reception (3GPP TS 36.104 version 10.8.0 Release 10)", ETSI TS 136.104 v10.8.0 (Nov. 2012), 116 pages.
ETSI, "LTE: Evolved Universal Terrestrial Radio Access (E-UTRA); Physical channels and modulation (3GPP TS 36.211 version 10.4.0 Release 10)", ETSI TS 136 211 V10.4.0 (Nov. 2012), 102 pages.
Hsieh et al. "Channel Estimation for OFDM Systems Based on Comb-Type Pilot Arrangement in Frequency Selective Fading Channels," *IEEE Transactions on Consumer Electronics*, Vo. 44, No. 1, Jan. 13, 1998, pp. 217-225.
Srivastava et al., "Robust MMSE Channel Estimation in OFDM Systems with Practical Timing Synchronization", *2004 IEEE Wireless Communications and Networking Conference*, vol. 4, Mar. 21-25, 2004, pp. 711-716.
Wen et al., "Timing and Delay Spread Estimation Scheme in OFDM Systems", *IEEE Transactions on Consumer Electronics*, vol. 54, No. 2, May 2008, pp. 316-320.
Yucek et al, "Doppler Spread Estimation for Wireless OFDM Systems", *2005 IEEE/Sarnoff Symposium on Advances in Wired and Wireless Communications*, Apr. 18-19, 2005, pp. 233-236.

* cited by examiner

CHANNEL ESTIMATION FOR A SUBSET OF RESOURCE ELEMENTS OF A RESOURCE BLOCK

CROSS REFERENCE TO RELATED APPLICATION

This application is a 35 U.S.C. §371 national stage application of PCT International Application No. PCT/EP2013/059734, filed on May 10, 2013, the disclosure and content of which is incorporated by reference herein in its entirety. The above-referenced PCT International Application was published in the English language as International Publication No. WO 2014/180510 A1 on Nov. 13, 2014.

TECHNICAL FIELD

The present disclosure generally relates to a technique for estimating a state of a wireless communication channel. In particular, and without limitation, the disclosure is directed to a technique that provides the channel state as a function of frequency and/or time.

BACKGROUND

Mobile access to data services and speech services requires fast and reliable wireless communication channels. Frequency-Division Multiple-Access (FDMA) is an example of a widely implemented multiple access scheme, including Orthogonal FDMA (OFDMA) in a downlink channel and Single Carrier FDMA (sc-FDMA) in an uplink channel of 3GPP Long Term Evolution (LTE). FDMA multiplexes the transmitted data on a plurality of subcarriers in the frequency dimension. FDMA thus provides a high data throughput rate and robustness against multipath interference due to frequency diversity. In addition, symbols can be stretched in time so as to exceed a delay spread of the wireless communication channel. Moreover, antenna diversity or spatial multiplexing can be combined with the frequency diversity and the temporarily stretched symbols to further increase robustness and data rates. Hence, frequency, time and space are examples for the transmit dimensions of a communication channel.

Harnessing the advantages of such modern transmission techniques often requires detailed knowledge of the state of the wireless communication channel in each combination of its different transmit dimensions. To determine the channel state at the receiver, a plurality of Reference Signals (also referred to as pilot signals) are assigned both in the time-domain and in the frequency-domain to a Resource Block prior to transmission. FIGS. 2(a) and (b) of research article "Channel Estimation for OFDMA systems based on Comb-type Pilot Arrangement in Frequency Selective Fading Channels" by M.-H. Hsieh et al., IEEE Transactions on Consumer Electronics, Vol. 44, Issue 1, pages 217-225, show exemplary subcarrier arrangements of the Reference Signals.

Document US 2011/0216842 A1 describes a wireless communication channel between a base station and a mobile device (also referred to as User Equipment, UE). The base station uses predetermined subcarriers for UE-specific Reference Signals.

LTE standard document 3GPP TS 36.213 (Release 11, Version 11.2.0) defines Transmission Modes with and without spatial multiplexing. Precoding for spatial multiplexing is described in Sect. 6.3.4.4 of 3GPP TS 36.211 (Release 11, Version 11.1.0). Transmission Mode 7 uses a single antenna port with UE-specific Reference Signals. Positions of the Reference Signals in time and frequency are defined in Sects. 6.2.1 and 6.10 of LTE standard document 3GPP TS 36.211 (Release 11, Version 11.1.0).

The Reference Signals are used for channel estimation at the given position in time and frequency. In principle, it is possible to apply filters to the Reference Signals providing channel estimates for each of the required Resource Elements within the Resource Block. Seminar report "Reference Signals and Channel Estimation" by L. D. C. Anthony, Seminar on Selected Chapters of Telecommunications, describes filters for channel estimation in the frequency direction (Sect. 4.2), in the time direction (Sect. 4.3) and in the spatial direction (Sect. 4.4). Such filters obey a specialized filter criterion, such as Minimum Mean Square Error (MMSE) or Least Square (LS). For example, a one-tap LS estimation can be applied to the Reference Signals for a coarse channel estimation that is input to an MMSE estimation resulting in channel estimates for each of the Resource Elements in the Resource Block, as is described in Sect. IV of research publication "Robust MMSE Channel Estimation in OFDM Systems with Practical Timing Synchronization" by V. Srivastava et al., WCNC 2004, pages 711-716.

However, the filtering is computationally expensive. Therefore, the channel estimates are computed by means of computationally complex filters only for a subset of non-Reference Signal positions. For the remaining Resource Elements, the channel estimates are linearly interpolated based on the filtered channel estimates.

While such a simplification of channel estimation describes the channel state in frequency, time and/or space with sufficient accuracy for some situations, there remain situations for which the simplification leads to poor channel estimates reducing the advantages of modern transmission techniques such as FDMA.

SUMMARY

There is a need for a technique that, in at least some implementations and situations, allows improving channel estimation without increasing computational complexity and/or decreasing computational complexity without degrading channel estimation.

According to one aspect, a method of performing channel estimation for a wireless communication channel is provided. The method comprises the steps of determining a channel condition for the wireless communication channel; applying an estimation filter to Reference Signals transmitted on the wireless communication channel, the filter estimating coefficients for a subset of Resource Elements transmitted on the wireless communication channel, wherein the subset is a function of the determined channel condition; and interpolating the estimated coefficients for Resource Elements not included in the subset.

In at least some implementations, the technique allows selecting or arranging the Resource Elements, for which the coefficients are estimated by means of a computationally more complex estimation filter, depending on the determined channel condition so that a computationally less complex interpolation based on the filtered Resource Elements to other Resource Elements yields more accurate coefficients without increasing the computational complexity of the estimation filter. For example, the technique allows that the subset is optimized to fit a structure of a channel transfer function determined by the channel condition.

The Resource Elements may be arranged in frequency and time. The arrangement of the Resource Elements of the subset may be a function of the determined channel condition. The coefficients may be estimated for each Resource Element in the subset. The Resource Elements in the subset may be used as supporting points of the interpolation. The subset may be optimized to fit a coarse structure of the channel transfer function in frequency and time.

The wireless communication channel may be a multipath channel. The wireless communication channel may exhibit fading, e.g., fast fading. The fading may be a function of time, of frequency or of time and frequency. The channel condition may classify or quantify fading or attenuation in a frequency direction and/or a temporal direction. E.g., the channel condition may classify or quantify the variability of the fading in frequency and/or time. The subset may be optimized to fit a fading structure of the channel determined by the channel condition.

The estimated coefficients may include at least one of channel coefficients, combining-weight coefficients and gain coefficients. The estimated coefficients, e.g., the channel coefficients, may represent the channel estimation. Alternatively or in addition, the estimated coefficients, e.g., the combining-weight coefficients or the gain coefficients, may be based on the channel estimation.

The application of the estimation filter may include estimating channel coefficients for the Resource Elements of the subset based on the Reference Signals. The interpolation may include computing combining-weight coefficients and gain coefficients for Resource Elements not included in the subset based on the channel coefficients.

The application of the estimation filter may include at least one of a Least Square estimation filter, a Least Mean Square estimation filter, a Zero Forcing estimation filter, a Minimum Mean Square Error estimation filter and a Maximum-Likelihood estimation filter.

The channel condition may be different from the channel estimation. The cannel condition may only classify or quantify the variability, e.g., a mean periodicity, of the fading in time and/or frequency. The channel estimation may quantify phase shift and fading, e.g., by means of complex-valued channel coefficients, H.

The estimation filter may be applied directly to the Reference Signals as received on the wireless communication channel. Alternatively or in combination, the application of the estimation filter may include computing a coarse channel estimation for Resource Elements including the Reference Signals. Resulting coarse channel estimates may then be input to the estimation filter, which estimates the coefficients for the Resource Elements of the subset. The coarse channel estimation may include a one-tap estimation or an estimation that does not take account of correlations between different Resource Elements including the Reference Signals. The coarse channel estimation may compute a channel coefficient for each Resource Element having a Reference Signal. E.g., a ratio may be computed between a signal received at the Resource Element and the Reference Signal predefined for said Resource Element.

The transmitted Reference Signals may predefined by a standard applied by a sender and a receiver of the wireless communication. The receiver may further obtain channel quality measurements based on the Reference Signals, e.g., the channel condition may also be determined using the Reference Signals. The receiver may be a User Equipment (UE) in a downlink transmission. The sender may be a base station in the downlink transmission. The base station may define a cell of a cellular telecommunications network. The wireless communication may include UE-specific Reference Signals or cell-specific Reference Signals.

A transmission on the wireless communication channel may use one or more antenna ports. One set of Reference Signals specific for one antenna port may be transmitted for each antenna port. The number of physical transmit antennas may be equal to or greater than the number of antenna ports. Each antenna port may use its own OFDM modulation. In a communication using more than one antenna port, only one Reference Signal may be transmitted at a time for cell-specific Reference Signals.

When one of the antenna ports transmits a Reference Signal, other antenna ports may be silent. This may facilitate channel estimation for the different antenna ports at the receiver. The combining-weight coefficients may be computed for decoupling data streams transmitted on the wireless communication channel.

The method may further comprise the step of selecting the Resource Elements of the subset. Alternatively or in combination, the method may further comprise the step of selecting the subset from a plurality of predefined subsets. In either case, the selection may depend on the determined channel condition. The plurality of predefined subsets may include different subsets. Each of the predefined subsets may be associated to a value, range or interval of the channel condition. Each of the predefined subsets may be stored in association to the value, range or interval for the channel condition. The stored values, ranges or intervals for the channel condition may be disjoined for a unique selection of one of the predefined subsets given the channel condition.

The channel condition of the wireless communication channel may include, indicate or depend on at least one of frequency selectivity, delay spread, Doppler spread and coherence time. The channel condition may distinguish different cases of fast fading. In at least some implementations, the channel condition does not relate to slow fading. The delay spread may be any measure for multipath length variance.

A number of the Resource Elements of the subset may be increased in a frequency direction and/or a number of the Resource Elements of the subset may be decreased in a temporal direction, if the channel condition for the wireless communication channel indicates at least one of an increase in frequency selectivity, an increase in delay spread, an increase in coherence time and a decrease in Doppler spread. The selection may decrease a mean frequency separation of the Resource Elements in the subset and/or increase a mean temporal separation of the Resource Elements in the subset as the channel condition for the wireless communication channel indicates at least one of an increase in frequency selectivity, an increase in delay spread, an increase in coherence time and a decrease in Doppler spread.

Alternatively or in combination, a number of the Resource Elements of the subset may be increased in a temporal direction and/or a number of the Resource Elements of the subset may be decreased in a frequency direction, if the channel condition for the wireless communication channel indicates at least one of a decrease in frequency selectivity, a decrease in delay spread, a decrease in coherence time and an increase in Doppler spread.

The selection may decrease a mean temporal separation of the Resource Elements in the subset and/or increase a mean frequency separation of the Resource Elements in the subset as the channel condition for the wireless communication channel indicates at least one of a decrease in frequency selectivity, a decrease in delay spread, a decrease in coherence time and an increase in Doppler spread.

Herein, the number of Resource Elements of the subset in a frequency direction may relate to the number of Resource Elements of the subset within the same symbol averaged over symbols including at least one or two Resource Elements of the subset. The number of Resource Elements of the subset in a temporal direction may relate to the number of Resource Elements of the subset within the same subcarrier averaged over subcarriers including at least one or two Resource Elements of the subset.

Furthermore, the mean frequency separation of the Resource Elements in the subset may be quantified by the separation of neighboring Resource Elements of the subset within the same symbol averaged over symbols including at least two Resource Elements of the subset. The mean temporal separation of the Resource Elements in the subset may be quantified by the separation of neighboring Resource Elements of the subset within the same subcarrier averaged over subcarriers including at least two Resource Elements of the subset.

The Resource Elements may be transmitted in a Resource Block. The subset may be a proper (i.e., strict) subset of the Resource Block. The interpolation may provide coefficients for all Resource Elements in the Resource Block that are not included in the subset.

The Resource Elements of the subset may be arranged across time and frequency. The wireless communication may use Orthogonal Frequency-Division Multiplexing (OFDM). The Resource Elements of the subset may be arranged across frequency by means of OFDM. The Resource Elements of the subset may be arranged across time in different OFDM symbols. The Resource Elements of the subset may be included in a Resource Block of the wireless communication. The Resource Elements of the subset may be spread across the Resource Block. The Resource Elements of the subset may be non-adjacent. The Resource Block may include a Resource Element not included in the subset between any pair of Resource Elements included in the subset.

The Resource Block may include a plurality of Resource Elements. The Resource Block may include a predefined number of subcarriers, e.g., 12 subcarriers, in frequency. The Resource Block may include a predefined number of symbols in time. For example, the Resource Block may include 6 or 7 symbols for extended or normal cyclic prefix, respectively. A pair of one subcarrier and one symbol may identify one of the Resource Elements in the Resource Block. A small fraction of all Resource Elements in the Resource Block may be allocated to the subset. E.g., the subset may occupy less than 10%, or even less than 1%, of the Resource Elements in the Resource Block. Each Reference Signal may occupy one Resource Element in the Resource Block. The subset may include all Resource Elements having a Reference Signals in the Resource Block.

The Resource Elements of the subset may be distributed in the Resource Block so that a number of the Resource Elements of the subset in a frequency direction is greater than a number of the Resource Elements of the subset in a temporal direction of the Resource Block, if the channel condition for the wireless communication channel is indicative of high frequency selectivity. Alternatively or in combination, the Resource Elements of the subset may be distributed in a Resource Block so that a number of the Resource Elements of the subset in a temporal direction is greater than a number of Resource Elements of the subset in a frequency direction of the Resource Block, if the channel condition for the wireless communication channel is indicative of high Doppler spread. The Resource Elements of the subset may be at least substantially uniformly distributed in frequency and time within the Resource Block, if the channel condition for the wireless communication is indicative of both high frequency selectivity and high Doppler spread. High Doppler spread and/or high frequency selectivity may be defined by a predefined threshold value for Doppler spread and frequency selectivity, respectively.

A number of Resource Elements of the subset in a temporal direction may be proportional to the Doppler spread of the wireless communication channel and/or inversely proportional to a coherence time of the wireless communication channel. The Doppler spread, $f_D$, in the frequency direction and the coherence time, $T_C$, in the time direction may be related by $T_C = 1/(4 f_D)$. Alternatively or in combination, a number of Resource Elements of the subset in a frequency direction may be proportional to the delay spread of the wireless communication channel and/or proportional to a coherence time of the wireless communication channel.

The subset of Resource Elements may correspond to a lattice in frequency and time that is restricted to the Resource Block. A temporal basis vector and a frequency basis vector may span the lattice. The frequency basis vector may decrease and/or the temporal basis vector may increase as the channel condition for the wireless communication channel indicates at least one of an increase in frequency selectivity, an increase in delay spread, an increase in coherence time and a decrease in Doppler spread. The temporal basis vector may decrease and/or the frequency basis vector may increase as the channel condition for the wireless communication channel indicates at least one of a decrease in frequency selectivity, a decrease in delay spread, a decrease in coherence time and an increase in Doppler spread.

An average of a direction between next-neighbor Resource Elements in the subset may be closer to a frequency direction than to a temporal direction, if the channel condition for the wireless communication channel is indicative of high frequency selectivity. Alternatively or in combination, the average of the direction between next-neighbor Resource Elements in the subset may be closer to the temporal direction than to the frequency direction, if the channel condition for the wireless communication channel is indicative of high Doppler spread. The average of the direction may be a weighted average of the direction. E.g., the distance or inverse distance between the next-neighbor Resource Elements may define the weight. The weighted direction may be represented by a vector between the next-neighbor Resource Elements. The direction may be represented by a two-dimensional vector in the Resource Block spanned by frequency and time. The vector may be defined up to a sign or may be limited to an upper half-plane, so that the vector represents a slope.

A total number of the Resource Elements in the subset may be at least substantially independent of the determined channel condition. For example, the number of Resource Elements in a frequency direction multiplied by the number of Resource Elements in a temporal direction may correspond to a computational complexity of the estimation, which may be kept essentially constant.

According to a further aspect, a computer program product is provided comprising program code portions for performing any embodiment of above method aspect when the computer program product is executed on a computing device. Further, a computer-readable recording medium storing the computer program product is provided. The computer-readable recording medium may take the form of a semiconductor memory and/or an optical memory. Still further, the computer program product may be provided for download onto such a computer-readable medium, e.g., via a network connection.

As to a hardware aspect, an apparatus for performing channel estimation for a wireless communication channel is provided. The apparatus comprises a determining unit adapted to determine a channel condition for the wireless communication channel; a filtering unit adapted to apply an estimation filter to Reference Signals transmitted on the wireless communication channel, the filter estimating coefficients for a subset of Resource Elements transmitted on the wireless communication channel, wherein the subset is a function of the determined channel condition; and an interpolating unit adapted to interpolate the estimated coefficients for Resource Elements not included in the subset.

The apparatus may further comprise a memory unit adapted to store a plurality of predefined subsets, wherein the subset is retrieved from the memory unit depending on the determined channel condition.

BRIEF DESCRIPTION OF THE DRAWINGS

Hereinafter, the disclosure is described in more detail with reference to exemplary embodiments illustrated in the drawings, wherein FIG. 1 schematically illustrates a wireless communication channel and a receiver including an apparatus for performing channel estimation for the wireless communication channel.

DETAILED DESCRIPTION

In the following description, for purposes of explanation and not limitation, specific details of the disclosure are set forth, such as specific apparatus configurations and specific wireless communication channels in order to provide a thorough understanding of the technique disclosed herein. It will be apparent to one skilled in the art that the technique may be practiced in other embodiments that depart from these specific details. Moreover, while the following embodiments are primarily described in the context of a mobile telecommunications channel according to Long Term Evolution (LTE), it will be readily apparent that the technique can also be practiced in the context of other wireless communication standards including the IEEE 802.11 standards (Wi-Fi). Moreover, while in the following reference will be made to a downlink transmission from a base station to a mobile device, the technique can also be implemented in a base station and/or applied for an uplink.

Those skilled in the art will further appreciate that the methods, steps and functions explained herein can be implemented using individual hardware circuitry, using software functioning in conjunction with a programmed microprocessor or general purpose computer, using an Application Specific Integrated Circuit (ASIC) and/or using one or more Digital Signal Processors (DSPs). It will also be appreciated that, while the following embodiments are primarily described in the form of a method and an apparatus, the technique disclosed herein may also be embodied in a computer processor and a memory coupled to the processor, wherein the memory stores one or more programs that perform the steps discussed herein when executed by the processor.

Figure 1:
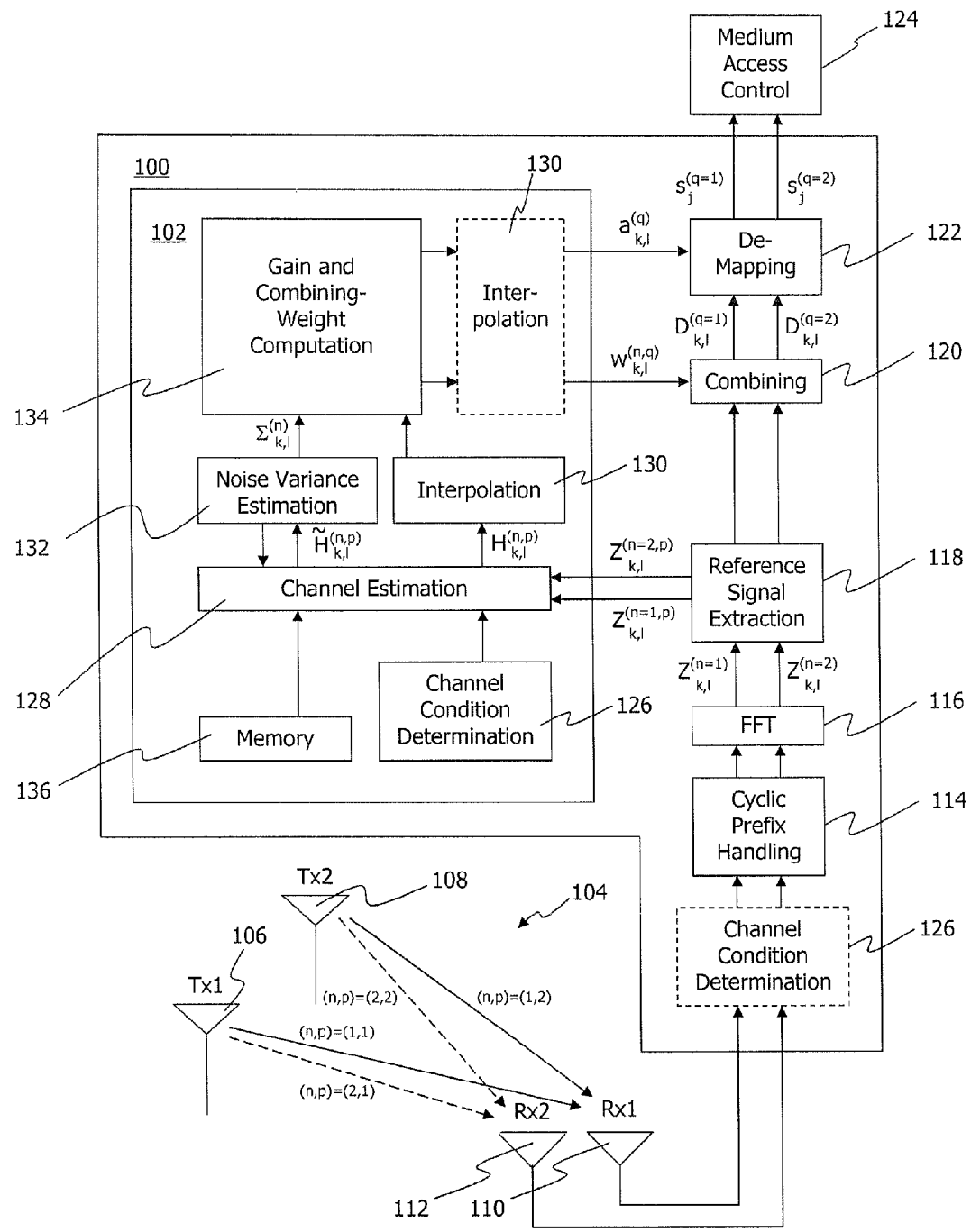

FIG. 1 shows a receiver stage 100 in a mobile device, which is also referred to as User Equipment (UE). The receiver stage 100 implements a physical layer according to the LTE standard. The receiver stage processes downlink signals. The downlink channel uses Orthogonal Frequency Division Multiplexing (OFDM), i.e., the downlink signals are OFDM signals including a grid of Resource Elements (REs) spanned by subcarriers along the frequency direction and symbols along the time direction.

A set of $N_{sc}=12$ subcarriers and $N_{symb}=7$ symbols is referred to as a Resource Block (RB). 14 symbols are denoted Resource Block pair. The Resource Block is the smallest allocable unit of Resource Elements in uplink or downlink. The Resource Block thus contains 12·14=168 Resource Elements, each of which is identified by a combination of one subcarrier and one symbol.

The receiver stage 100 includes an apparatus 102 for performing channel estimation. The apparatus 102 comprises a channel condition determination unit 126, a channel estimation unit 128 and an interpolation unit 130.

The channel estimation unit 128 provides a state, H, of a wireless communication channel 104. The state of the channel 104 is a transfer function of the channel 104. The transfer function is also referred to as channel response. The channel state, H, is a function of frequency and time. Channel coefficients, are a discretized representation of the channel state.

Certain Transmission Modes of LTE use spatial multiplexing on the channel 104, which is illustrated by additional dashed lines in FIG. 1. When operated in a spatial multiplexing Transmission Mode, the channel estimation 128 additionally represents the transfer function for different spatial layers. Data streams (also referred to as codewords) are mapped to the spatial layers. FIG. 1 illustrates the data streams q=1 and q=2 in the receiver stage 100. The number of spatial layers can be selected differently from the transmission rank of the wireless communication channel 104. The transmission rank is the capability in terms of layers to transmit on the wireless channel. Either the number of layers is lower, which means the capabilities of the channel are not exploited. Or the number of layers is higher, so that the transmission will not succeed. At the transmission side, the spatial layers are mapped to the antenna ports in a precoding step. In Release 8 of LTE standard document 3GPP TS 36.211, up to four spatial layers are supported for the downlink communication channel 104.

For the LTE downlink, sender and receiver stage 100 process data according to one of 8 Transmission Modes (TMs), 7 of which are specified since Release 8 of LTE standard document 3GPP TS 36.213. TM1 uses antenna port 0 as a single-antenna port. TM2 provides transmit diversity. TM3 provides open loop spatial multiplexing. TM4 provides closed loop spatial multiplexing. TM5 provides multi-user MIMO. TM6 provides closed loop precoding for transmission rank 1. TM7 uses antenna port 5 as a single-antenna port.

One or more transmit antennas may be used when transmitting UE-specific Reference Signals. Transmitting on more than one antenna allows for UE-specific beamforming. As an example for LTE, on the Physical Downlink Shared Channel (PDscH, which is a major downlink channel of LTE), the antenna port 5 can be used in the TM7. A physical antenna configuration may use 2 transmit antennas 106 and 108, or even 4 transmit antennas. Both data and a set of Reference Signals may be transmitted using the same transmit antenna weightings defining the beamforming. The receiver stage 100 may require only the set of UE-specific Reference Signals for demodulation of the PDscH. The receiver stage 100 may not have to know the actual number of physical transmit antennas. For the receiver stage 100, the data transmission may thus appear to have been received from only one virtual transmit antenna, which is denoted by the single antenna port 5 and illustrated by solid arrows in FIG. 1.

Since Release 9, LTE standard document 3GPP TS 36.213 further specifies two sets of Reference Signals that define antenna ports 7 and 8, respectively, for dual-layer UE-specific beamforming in TM8. The two spatial layers may be assigned to one UE (single-user MIMO). For single-user MIMO, the receiver stage 100 is connected to two receive antennas 110 and 112, and is capable of simultaneously receiving signals from the two transmit antennas 106 and 108, as is shown in FIG. 1 by the additional dashed arrows. Alternatively, the two layers may be assigned to two separate UEs (multi-user MIMO).

In the schematic illustration of the wireless communication channel 104, an index p=1 or 2 identifies the transmit antennas 106 and 108, respectively. An index n identifies the receive antennas 110 and 112. Importantly, the technique disclosed herein does not require that all of the antennas 106 to 112 are implemented, and the technique is not limited to any one of the Transmission Modes defined for LTE.

The receiver stage 100 includes a signal processing line shown on the right-hand side of the block diagram in FIG. 1. The signal processing line comprises a cyclic prefix handling unit 114, an FFT unit 116, a reference signal extraction unit 118, a combining unit 120 and a de-mapping unit 122.

In the time domain representation, each OFDM symbol comprises a cyclic prefix of 4.7 μs or 5.2 ρs allowing for compensation of delay spread or intersymbol interference. The cyclic prefix handling unit 114 positions an FFT window for the FFT processing unit 116 by applying a cyclic shift. Time synchronization and elimination of the cyclic prefix provides a complex-valued data vector of length $M_{FFT}$, which represents the OFDM symbol in the time domain. The vector is transformed into the frequency domain by the FFT unit 116, which provides the complex values Z of the received OFDM symbol. An index k in FIG. 1 denotes the subcarrier ranging from k=0 to $M_{FFT}-1$. An index l indicates a temporal sequence of the OFDM symbols.

At predetermined positions in frequency and time, Reference Signals are extracted by the Reference Signal extraction unit 118 from those Resource Elements identified by the pair of indices (k, l) specified in the LTE standard document 3GPP TS 36.211 (e.g., Release 10 in the Version 10.4.0, or later Release). While the extracted Reference Signals are provided to the apparatus 102, the full OFDM symbol is delayed for synchronization with the apparatus 102 and provided to the combining unit 120.

As output signals, the apparatus 102 provides combining-weight coefficients, w, and gain coefficients, a, to the combining unit 120 and the de-mapping unit 122, respectively. The combining unit 120 weights the OFDM amplitudes Z by multiplication with the corresponding combining-weight coefficient w and sums over the receive antennas 110, 112 according to the index n=1, 2, thus yielding symbols D for each of the codewords q=1, 2. The combining unit 120 is also referred to as an equalizer.

The codeword symbols D are fed into the de-mapping unit 122 for a quantization of soft-bits, s, according to a Quadrature Amplitude Modulation (QAM). The de-mapping unit 122 is also referred to as a demodulator. The soft bit streams, s, are output to a channel decoder providing hard bit streams towards a Medium Access Control unit 124.

In the embodiment of the apparatus 102 shown in FIG. 1, the apparatus 102 further comprises a noise variance estimation unit 132 and a gain and combining-weight computation unit 134. In a first variant of the embodiment, the units 132 and 134 are separately implemented in the receiver stage 100 and not included in the apparatus 102. In a second variant of the embodiment of the apparatus 102, which is compatible with the first variant, the channel condition determination unit 126 is integrated into the signal processing line, as is indicated by a dashed box in FIG. 1.

In a third variant of the embodiment of the apparatus 102, which is compatible with each of the embodiments and variants disclosed herein, the interpolation unit 130 is not arranged between the channel estimation unit 128 and the gain and combining-weight computation unit 134. Rather, the interpolation unit 130 is arranged downstream of the gain and combining-weight computation unit 134.

Figure 2:
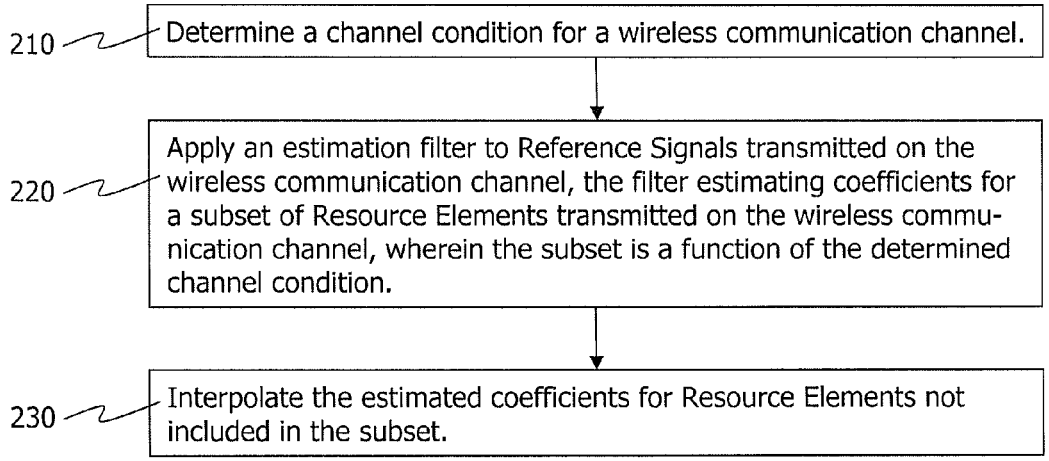
FIG. 2 shows a flowchart of a method of performing channel estimation for the wireless communication channel shown in FIG. 1.

FIG. 2 shows an embodiment of a method 200 of performing channel estimation for a wireless communication channel. The method 200 includes a step 210 of determining a current channel condition of the wireless communication channel. In a step 220, an estimation filter is applied to Reference Signals transmitted on the wireless communication channel. The filter estimates coefficients for a subset of Resource Elements transmitted on the wireless communication channel. The subset of Resource Elements is a function of the channel condition determined in the step 210. In a step 230 of the method 200, the estimated coefficients are interpolated for Resource Elements not included in the subset.

Depending on the pattern of Resource Elements forming the subset, the subset is also referred to as a lattice or a grid, e.g., a channel estimation grid or an equalization grid.

The method 200 is implemented in the apparatus 102 for the wireless communication channel 104. The steps 210, 220 and 230 are implemented by the units 126, 128 and 130, respectively. The interpolation 130 is based on the estimated coefficients as sampling points, which are also referred to as supporting points of the interpolation 130.

In the embodiment of the apparatus 102 shown with solid-framed boxes in FIG. 1, the estimated coefficients include the channel coefficients, H. The interpolation 230 is based on the channel coefficients available for the positions defined by the subset and yields channel coefficients for Resource Elements outside of the subset.

In the third variant of the embodiment of the apparatus 102 comprising the interpolation unit 130 arranged downstream of the gain and combining-weight computation unit 134, the estimated coefficients include the gain coefficients, a, and the combining-weight coefficients, w. The interpolation 230 is based on the coefficients a and w estimated for each of the Resource Elements in the subset. The interpolation 230 yields coefficients a and w for Resource Elements outside of the subset.

In existing mobile devices, the subset of Resource Elements is static, e.g., selected at design time of the mobile device. The apparatus 102 and the method 200 achieve a dynamic subset of Resource Elements, e.g., generated or selected during runtime of the apparatus 102.

The choice of the position of the Resource Elements, for which channel estimates are filtered, plays a crucial role in the quality of the channel estimation resulting from the interpolation 230. The number of Resource Elements in the subset largely determines the computational complexity of the channel estimation, which is dominated by the application of the estimation filter. Hence, the choice of the position and number of Resource Elements forming the subset is a trade-off between receiver performance and computational complexity.

The static channel estimation grid is necessarily a compromise, because it is applied in various different channel scenarios. Typically, the static channel estimation grid is uniform along both frequency and time. However, the uniform channel estimation grid has superfluous computations, e.g., when the channel 104 is predominantly frequency-selective or has only Doppler spread without substantial frequency selectivity. Therefore, the static subset does not produce the best receiver performance for its computational complexity.

The superfluous computations are utilized more efficiently by dynamically reallocating the Resource Elements of the subset, so as to improve the receiver performance. For example, when the channel 104 is only frequency-selective, the subset determining the positions for filtered channel estimates includes more Resource Elements along the frequency direction and less Resource Elements along the time direction.

In sum, the static subset does not provide the best performance for different or all use cases. Furthermore, using the static subset is computationally inefficient due to superfluous computations.

In one implementation of the channel estimation unit 128 and the step 220, which is compatible with each of the embodiments and variants disclosed herein, the subset is generated responsive to the determined channel condition. Another implementation dynamically selects the subset at runtime out of a plurality of predetermined subsets. In the embodiment shown in FIG. 1, the apparatus 102 comprises a memory unit 136 including a plurality of different predetermined subsets, one of which is retrieved in the step 220 depending on the determined channel condition. In a combined implementation, the subset is selected from a plurality of most-frequently occurring channel conditions or standardized channel conditions. The subset is generated at runtime, when a rare channel condition is determined, or if no predetermined subset is available for the determined channel condition.

Figure 3:
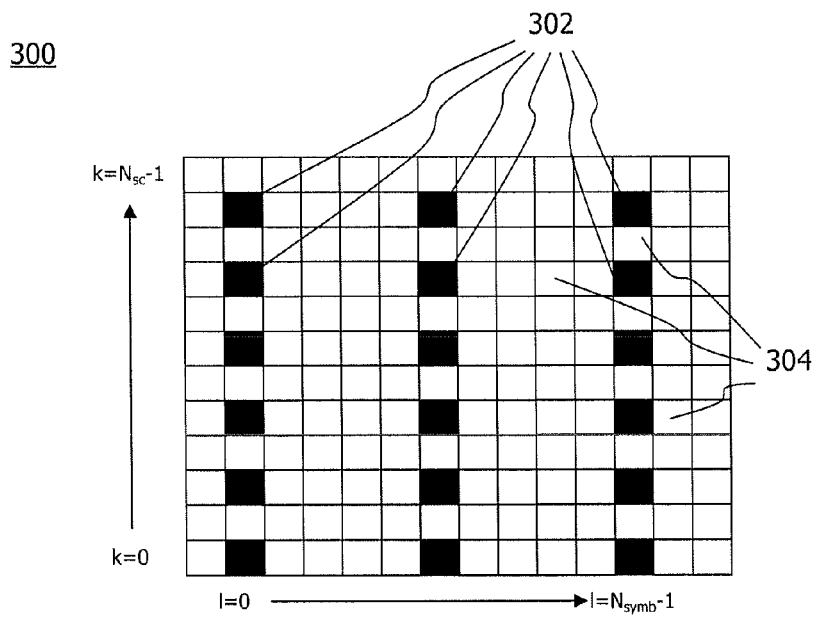
FIG. 3 schematically illustrates a subset of Resource Elements optimized for a channel condition indicating high frequency selectivity.

Examples for dynamically generated or predetermined subset are illustrated in FIGS. 3 to 6. FIG. 3 schematically illustrates a Resource Block 300. Each square represents one Resource Element in the Resource Block 300. The Resource Elements represented by black squares (which are partially indicated by reference sign 302) are the Resource Elements forming the subset. Resource Elements represented by white squares (which are partially indicated by reference sign 304) are outside of the subset. The estimation filter provides in the step 220 the coefficients for the Resource Elements 302. The interpolation 230 yields the coefficients for the Resource Elements 304.

The subset schematically illustrated in FIG. 3 includes more Resource Elements in the frequency direction (i.e., the vertical axis in FIG. 3) than in the time direction (i.e., the horizontal axis in FIG. 3). The subset of FIG. 3 is used in the step 220, if the determined channel condition indicates multiple propagation paths for the wireless communication channel 104.

The multiple propagation paths are detected, e.g., by a fading behavior of the communication channel 104 and/or a delay spread of the communication channel 104. The fading behavior and the delay spread, in isolation or in combination, are examples for the channel condition. Multiple propagation paths in the communication channel 104 can cause frequency selectivity. Frequency selectivity means that the transfer function, H, of the wireless communication channel 104 is varying considerably along the frequency direction. E.g., the channel state varies on a frequency scale shorter than the bandwidth of the Resource Block 300.

Based on the determined channel condition, the subset is selected in the step 220. Hence, when the channel condition indicates high frequency selectivity, a high number of filtered channel estimates are computed along the frequency direction.

Figure 4:
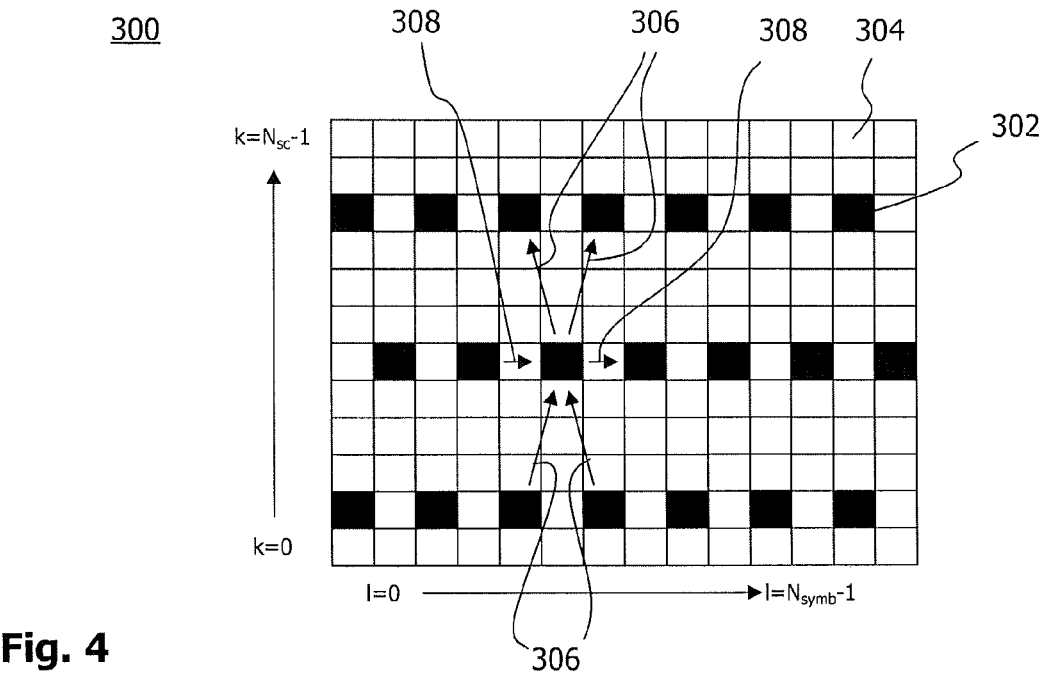
FIG. 4 schematically illustrates a subset of Resource Elements optimized for a channel condition indicating high Doppler spread.

FIG. 4 schematically illustrates the subset of Resource Elements 302 in the Resource Block 300 used in the step 220, if the determined channel condition indicates low coherence for the wireless communication channel 104. Doppler spread, $D_S$, decreases the coherence time, $T_C$, of the wireless communication channel 104. As a consequence, the transfer function, H, varies considerably along the time direction. E.g., the channel state varies on a time scale shorter than the duration of the Resource Block 300.

Hence, when the channel condition indicates high Doppler spread, a higher number of filtered channel estimates are computed along the time direction, as is schematically illustrated in FIG. 4.

The subset schematically illustrated in FIG. 3 is an example of a rectangular lattice. Other examples of subsets include regular lattices that are not a rectangular lattice (also referred to as a non-rectangular lattice). For a non-rectangular lattice, basis vectors of the lattice do not coincide with the transmit dimensions, such as frequency and time. The subset schematically illustrated in FIG. 4 is an example for a non-rectangular lattice. The person skilled in the art will appreciate that a non-rectangular lattice can also be applied to the channel condition indicating high frequency selectivity instead of the rectangular lattice shown in FIG. 3. A subset formed by a non-rectangular lattice of Resource Elements can allow reducing the number of elements in the subset for certain channel conditions. A subset formed by a rectangular lattice of Resource Elements can simplify the estimation 220 and the interpolation 230.

A subset of Resource Elements arranged in a rectangular lattice can be optimized for high frequency selectivity by decreasing the distance between Resource Elements in the subset along the frequency direction and/or increasing the distance between neighboring Resource Elements in the subset along the time direction. Conversely, a subset, formed by a rectangular lattice of Resource Elements can be optimized for high Doppler spread by decreasing the distance between neighboring Resource Elements in the subset along the time axis and/or increasing the distance between neighboring Resource Elements in the subset along the frequency direction.

A general criterion for the subset is described. The criterion is applicable to both subsets formed by Resource Elements arranged in a rectangular lattice and to subsets formed by Resource Elements arranged in a non-rectangular lattice. The criterion is also applicable to subsets, the Resource Elements of which are not arranged in a lattice or grid. The criterion is applied for selecting or generating the subset as a function of the channel condition. The criterion can also be applied for compiling or generating the predetermined subsets for the selection.

The arrows shown in FIG. 4 schematically illustrate the computation of the criterion. The arrows 306 and 308 indicate next-neighbor separations of the Resource Elements 302 forming the subset. The arrows 306 indicate frequency-like separations. The arrows 308 indicate time-like separations. Opposite directions of separation vectors are deemed equivalent so that the criterion is based on the orientation, $\phi$, of the line of separation.

An implementation of the criterion averages over all lines connecting next neighbors. The criterion is based on both separation length and separation orientation. The result is an average line of separation. The result is quantified by the orientation, $\phi$, of the average line of separation.

If the average orientation $\phi$ is closer to the frequency axis than to the time axis, the subset is used for a channel condition indicating high Doppler spread. A subset, which has an average orientation $\phi$ closer to the time axis than to the frequency axis, is used for channel conditions indicating frequency-selectivity.

A simplified implementation of the criterion averages only the orientation $\phi$ of the line of separation. As before, $\phi = (\arg e^{2i\alpha})/2$ represents a slope, $0 \leq \phi \leq \pi$, for the angles $\alpha$ of the separation vectors 306 and 308. The factor 2 accounts for the equivalence of opposite directions. The result is the average orientation $\phi = \langle \phi \rangle$. The angle bracket denotes the averaging.

The definition of the orientation is optionally biased. The bias weights the frequency density of Resource Elements in the subset relative to the temporal density of Resource Elements in the subset. For example, the bias can define an "equal" level of Doppler spread and frequency selectivity, as schematically illustrated in FIG. 5.

According to a first bias, the lines of separation are defined in a representation of the Resource Block 300, so that each of the Resource Elements 302 and 304 in the Resource Block 300 is represented by a square. For the first bias, the representation of the Resource Block 300 extends in the temporal direction proportional to the number of symbols $N_{symb}$ and in the frequency direction proportional to the number of subcarriers $N_{sc}$.

According to a second bias, the Resource Block 300 is represented by a square. For the second bias, the Resource Elements 302 and 304 within the Resource Block 300 are represented by rectangles, which linear dimensions are stretched depending on the ratio $N_{symb}/N_{sc}$.

Figure 5:
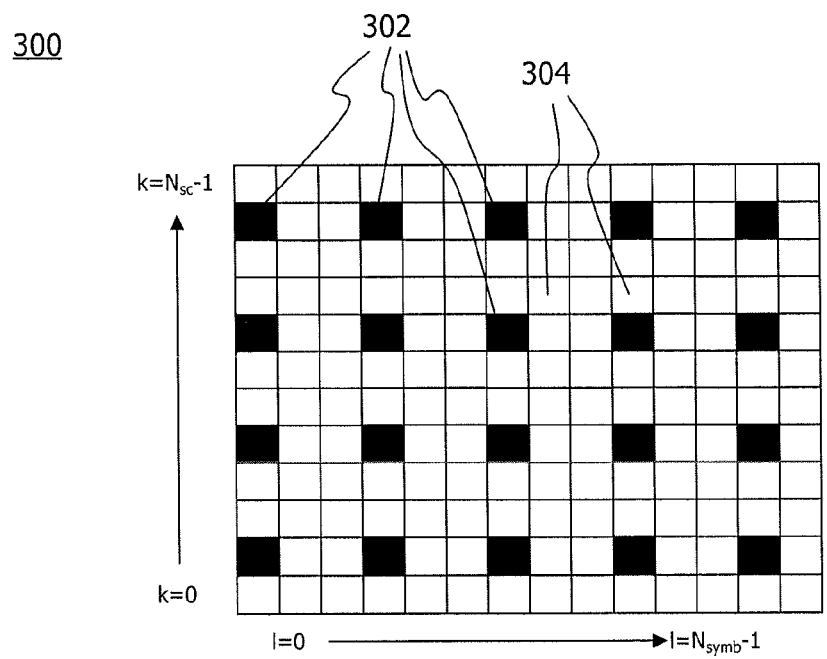
FIG. 5 schematically illustrates a subset of Resource Elements that equally extends in frequency and time for a channel condition indicating an equal level of Doppler spread and frequency selectivity.

FIG. 5 schematically illustrates a subset used in the step 220, if the channel condition indicates both high frequency-selectivity and high Doppler spread. The Resource Elements forming the subset are distributed uniformly in frequency and time.

Each of the three exemplary subsets described with reference to FIGS. 3 to 5 are homogeneously distributed over the Resource Block. Alternatively or in combination, the Resource Elements of the subset can be inhomogeneously distributed in the Resource Block 300. For example, a density of Resource Elements 302 of the subset can be higher at a center frequency of the Resource Block 300. The Resource Elements 302 of the subset can be sparse at the highest and lowest frequency of the Resource Block 300.

Figure 6:
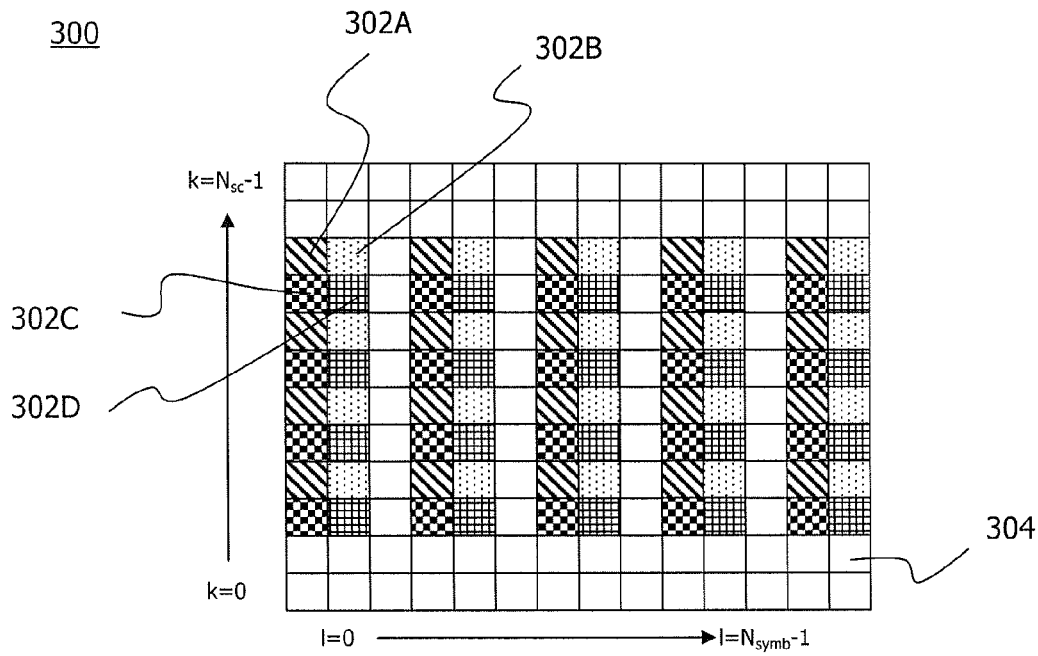
FIG. 6 schematically illustrates a subset of Resource Elements selected for a MIMO channel as the wireless communication channel shown in FIG. 1.

FIG. 6 shows an example of an inhomogeneous subset formed by Resource Elements 302A. For a wireless communication channel 104 having multiple spatial layers, dedicated subsets are formed by the Resource Elements 302B, 302C, and 302D for each further spatial layer. The dedicated subsets for different spatial layers are mutually disjoined subset of the Resource Block 300.

Figure 7:
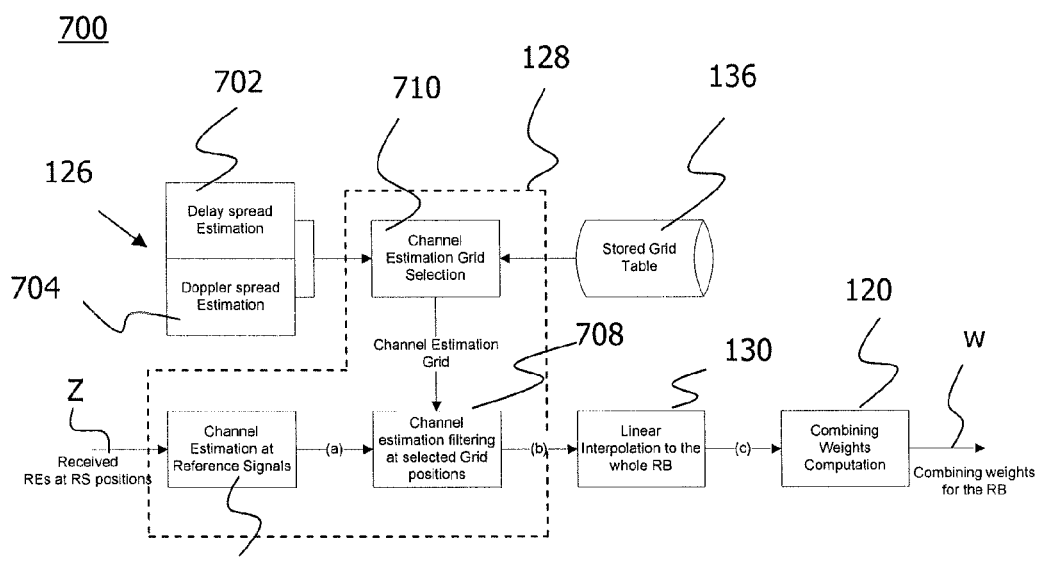
FIG. 7 shows a block diagram for the apparatus of FIG. 1.

FIG. 7 shows a functional block diagram 700 of the apparatus 102. The received OFDM values Z at Resource Elements of the Reference Signal are supplied in the Fourier domain to the channel estimation unit 128. In parallel, the channel condition determination unit 126 provides the channel condition to the channel estimation unit 128. The channel condition includes a delay spread estimation 702 and a Doppler spread estimation 704.

The channel condition is computed using a history of measured values and/or currently measured values. In a variant of the embodiment of the apparatus 102, the channel condition determination unit 126 provides measurement values for at least one of Doppler spread, delay spread and Signal-to-Noise Ratio (SNR). The channel condition includes the measured values in isolation. Alternatively, the measured values are aggregated in one combination value.

Further details on Doppler spread estimation, e.g., in the context of LTE and OFDM, are provided in research publication "Doppler spread estimation for wireless mobile radio systems", H. Arslan et al., IEEE Wireless Communications and Networking Conference, 2000; in document U.S. Pat. No. 7,599,453 B2; and in proceedings "Doppler spread estimation for wireless OFDM systems", T. Yucek et al., IEEE/Sarnoff Symposium on Advances in Wired and Wireless Communication, 2005.

Further details on delay spread estimation are provided in research publication "Timing and delay spread estimation scheme in OFDM systems", W. Jyh-Horng et al., IEEE Transactions on Consumer Electronics, May 2008; in document U.S. Pat. No. 8,121,206 B2; and in document US 2003/0026360 A1.

The channel estimation unit 128 includes a subunit 706 adapted to perform channel estimation at the positions of the Reference Signals, a subunit 708 adapted to perform channel estimation filtering at the positions defined by the subset (i.e., at the Resource Elements 302), and a subunit 710 adapted to select the subset. The unit 706 receives the OFDM values Z of the Resource Elements and computes channel estimates at the positions of the Reference Signals based on the received OFDM values Z and the expected reference sequence.

The channel estimation performed by the unit 706 is also referred to as coarse channel estimation, $\hat{H}$. The coarse channel estimation, e.g., by the unit 706, and the determination of the channel condition, e.g., by the channel condition determination unit 126, are performed simultaneously.

In the step 220, the unit 710 selects the subset based on the channel condition combining the estimations 702 and 704 and retrieves the selected subset from the memory unit 136. The unit 708 performs in the step 220 the channel estimation for the Resource Elements specified by the subset. The channel estimation is processed by the interpolation unit according to the step 230.

Figure 8:
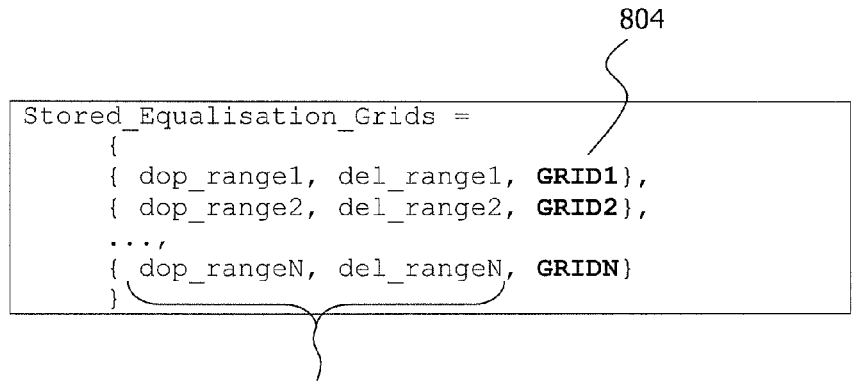
FIG. 8 schematically illustrates a structure for storing a plurality of subsets in association with different ranges for the channel condition.

FIG. 8 shows a data structure 800 stored in the memory unit 136. The data structure 800 represents a table.

The memory unit 136 includes the plurality of predetermined subsets and the data structure 800. The data structure 800 refers to the predetermined subsets individually. In the last column 804, the entry "GRIDx" (for x=1 to N) is a pointer to the corresponding subset. The first and second columns 802 of the data structure 800 specify ranges for the determined channel condition. The first column represents a range for the Doppler spread. The second column represents a range for the delay spread.

Figure 9:
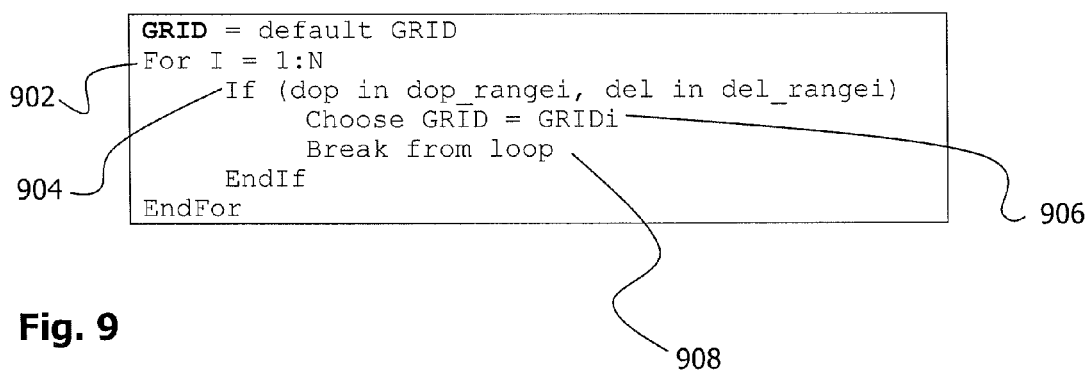
FIG. 9 schematically illustrates an implementation of a step of selecting the subset from the plurality of subsets shown in FIG. 8.

FIG. 9 shows a pseudo code implementation of the selection of the subset. The selection is performed by the unit 710 as a substep 900 of the step 220.

The selection 900 includes a search, implemented by a loop 902, for a match between the determined channel condition and a combination of ranges defined for each of the subsets stored in the memory unit 136. The selection 900 retrieves the combination of ranges 802 and compares the retrieved combination with the combination of values according to the determined channel condition at a branching point 904. If the comparison 904 indicates a match, the corresponding subset 804 is selected by setting at reference sign 906 the pointer variable "GRID".

After the definition of the pointer GRID, the selection 900 is terminated by a return command 908 that hands over control from the unit 710 to the unit 708.

While above description with reference to FIGS. 1 to 9 relates to the runtime operation of the apparatus 102 according to the method 200, the technique can be extended to an earlier phase further including the step of predetermining a plurality of subsets 804 for different channel conditions 802.

Figure 10:
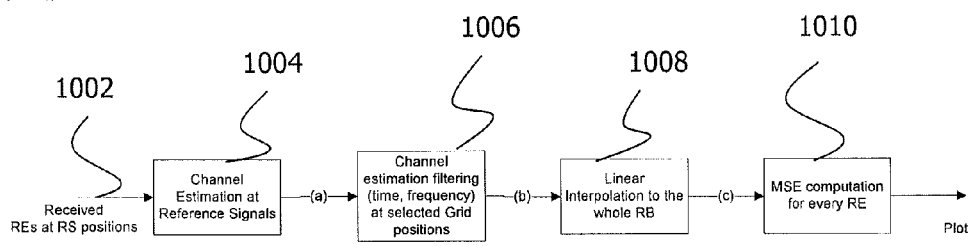
FIG. 10 shows a block diagram for assessing the performance of a subset of Resource Elements for a given state of the wireless communication channel.

FIG. 10 schematically illustrates a functional block diagram for a predetermination process 1000. The predetermination process 1000 generates the plurality of subsets 804 stored in the memory unit 136. The predetermination process 1000 can be performed in the context of a real-world experiment and/or a numerical experiment.

The numerical experiment is performed according to the 3GPP LTE standard and simulates a Transmission Mode 7 reception with Control Frame Indicator, CFI=1, i.e., the first symbol contains only control information and the further symbols (e.g., at symbol index l=2 to 14) contain data information. The measurements are performed on a single Resource Block 300. More specifically, the reception of $N_{symb}=14$ symbols in the time direction is simulated for $N_{sc}=12$ subcarriers in the frequency direction.

Based on the simulated reception of Resource Element values 1002 at Reference Signal positions, unit 1004 computes a coarse channel estimation at the Reference Signal positions. The coarse channel estimation is filtered in the time direction and the frequency direction by a unit 1006, yielding filtered channel estimates for the Resource Elements specified by a candidate subset. Based on the filtered channel estimates at the Resource Element of the candidate subset, the channel estimates for the other Resource Elements, which are not in the candidate subset, are linearly interpolated in a unit 1008.

A Mean Square Error (MSE) is computed for every Resource Element in the Resource Block 300 by a unit 1010. The MSE is computed based on a deviation between the linearly interpolated channel estimates and the state of the reference channel underlying the simulated reception.

Figure 11:
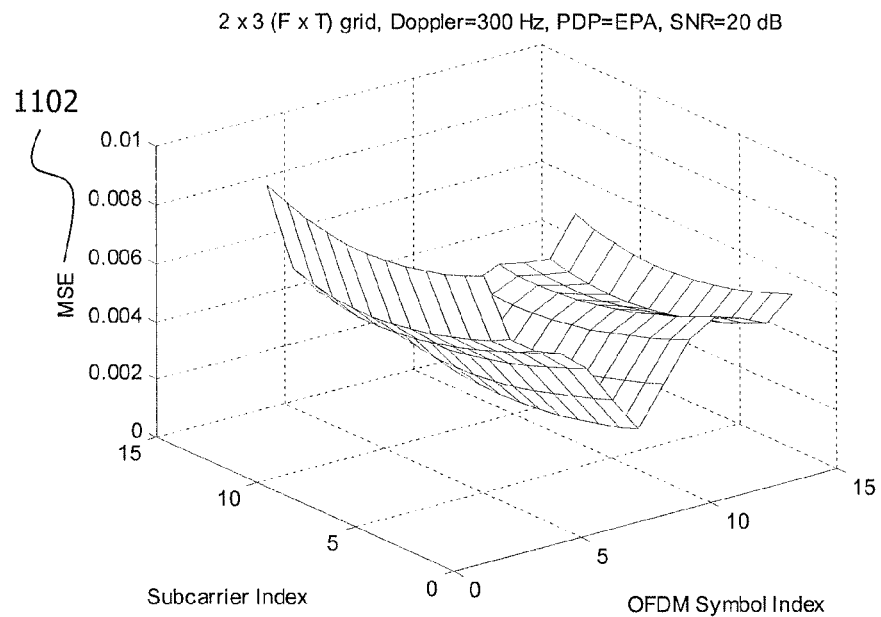
FIG. 11 shows a plot of a Mean Square Error resulting for a first subset from the assessment of FIG. 10 for a given state of the wireless communication channel.
Figure 12:
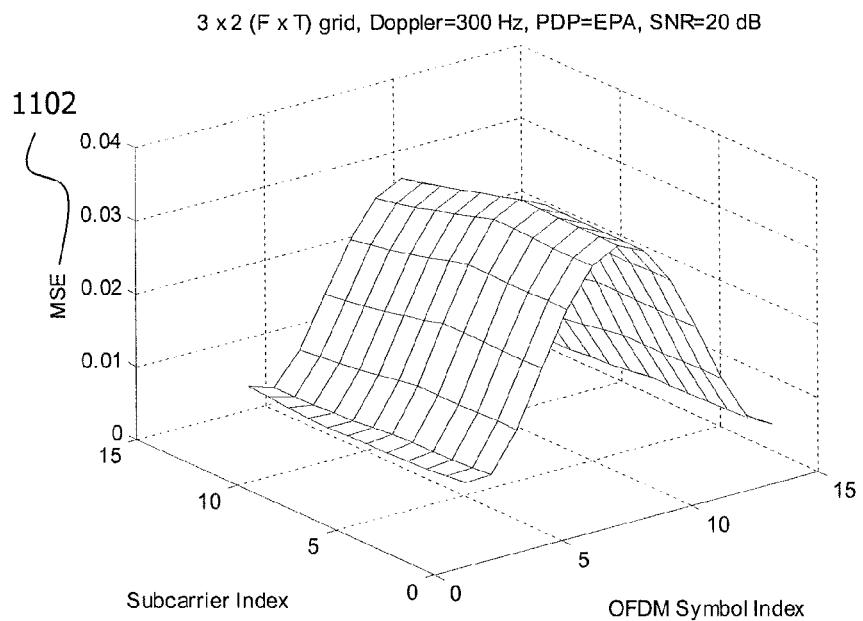
FIG. 12 shows a plot of a Mean Square Error resulting for a second subset from the assessment of FIG. 10 for the same state of the wireless communication channel used in FIG. 11.

FIGS. 11 and 12 show plots of the MSE as a function of both the subcarrier index k and the OFDM symbol index l. The MSE is plotted on the vertical axis at reference sign 1102.

One embodiment of the predetermination process 1000 decides upon including a candidate subset in the plurality of predetermined subsets based on a mean MSE averaged over k and l. An advanced implementation of the predetermination process 1000 takes into account the dependency of the MSE as a function of k and l.

The plurality of predetermined subsets is stored in the memory unit 136 upon manufacture of the receiver stage 100. The predetermination process 1000 can thus relate to a method of manufacturing the receiver stage 100.

As evidence for an improvement in receiver performance, quantitative simulation results for two different subsets (out of the plurality of predefined subsets) are presented. Below Table specifies the pattern of Resource Elements forming the predefined subsets (which are also referred to as predesigned grids):

| Grid | Frequency Direction | Time Direction |
|---|---|---|
| 3 × 2 (F × T) | Subcarriers 1, 6, 12, and the intermediate ones are linearly interpolated. | Symbols 2, 14, and the intermediate ones are linearly interpolated. |
| 2 × 3 (F × T) | Subcarriers 1, 12, and the intermediate ones are linearly interpolated. | Symbols 2, 8, 14, and the intermediate ones are linearly interpolated. |

The performance of the two subsets defined by each of the first and second lines in above Table is compared computing the MSE for the simulated channel 104, as specified in Annex B of standard document 3GPP TS 36.104, Release 10, Version 10.8.0.

Three different communication channels 104 have been chosen for the simulation. Additionally, a Doppler spread is imposed on the simulated channels 104, as is indicated in below Table:

| FLAT | Channel 104 has no fading or frequency selectivity. |
|---|---|
| EPA | Channel 104 has moderate delay spread and frequency selectivity. |
| ETU | Channel 104 has high delay spread and frequency selectivity. |

The Signal-to-Noise Ratio (SNR) is set to 20 dB for each of the wireless communications channels 104.

The experimental results are quantified by the average of the MSE over all Resource Elements in the Resource Block 300, which is indicated in the last column of below Table as the Mean MSE:

| Channel | Doppler Spread | Grid | Mean MSE |
|---|---|---|---|
| EPA | 300 Hz | 2 × 3 (F × T) | 0.0046 |
| EPA | 300 Hz | 3 × 2 (F × T) | 0.0198 |
| ETU | 300 Hz | 2 × 3 (F × T) | 0.0807 |
| ETU | 300 Hz | 3 × 2 (F × T) | 0.0303 |
| ETU | 50 Hz | 2 × 3 (F × T) | 0.0808 |
| ETU | 50 Hz | 3 × 2 (F × T) | 0.0190 |

FIGS. 11 and 12 related to the two different subsets. The MSE plotted in FIGS. 11 and 12 results for the EPA channel. The first and second lines of above Table summarize the MSE results shown in FIGS. 11 and 12, respectively. For the EPA channel with $D_S=300$ Hz for the Doppler spread, the first subset shaped 2×3 (in frequency and time) performs better than the second subset shaped 3×2 (F×T), since the additional estimation along the time direction improves the accuracy of the time varying communication channel 104.

For the ETU channel with 300 Hz and 50 Hz Doppler spread, the 3×2 (F×T) subset performs better than the 2×3 (F×T) subset, which is unlike the EPA channel. This is because the additional estimation along the frequency direction improves the accuracy of the frequency-selective communication channel 104.

Hence, the experimental results support that receiver performance is improved by selecting the subset applied in the step 220 as a function of the channel condition. Noteworthy, both of the two exemplary subsets 2×3 (F×T) and 3×2 (F×T) have the same number of Resource Elements, for which the filtered channel estimates have to be computed.

As has become apparent based on above description of exemplary embodiments, at least some of the embodiments provide an optimal trade-off between receiver performance and computational complexity. Same or some other embodiments provide the best performance at a given computational complexity.

For LTE, the technique is well-suited for Transmission Mode 7, wherein Reference Signals are sparse. The technique is beneficially applied for transmission schemes using four transmit antennas, because of the high computational complexity. These advantages can also be achieved for any other system employing OFDM or similar multiplexing schemes, and is not necessarily limited to LTE systems.

The technique is also applicable on the level of combining-weight coefficients, wherein a dynamic subset defines the Resource Elements for which the combining-weight coefficients are estimated as an accurate basis for efficiently computing further combining-weight coefficients for Resource Elements outside of the subset.

The invention claimed is:

1. A method in a mobile device of performing channel estimation for a wireless communication channel, the method comprising:
   determining a channel condition for the wireless communication channel, wherein the channel condition of the wireless communication channel is indicative of at least one of a delay spread and a Doppler spread of the wireless communication channel;
   selecting, by the mobile device, a subset of Resource Elements of a Resource Block of the wireless communication channel based on the determined channel condition;
   applying, by the mobile device, an estimation filter to reference signals received on the wireless communication channel or to coarse channel estimations based on the reference signals, by estimating channel coefficients for the subset of Resource Elements of the Resource Block of the wireless communication channel; and
   determining, by the mobile device, channel coefficients for Resource Elements not included in the subset by interpolating the estimated channel coefficients for the subset of Resource Elements.

2. The method of claim 1, wherein the channel condition is determined by measuring fading on the wireless communication channel as a function of at least one of frequency and time.

3. The method of claim 1, wherein selecting a subset of Resource Elements comprises selecting the subset from a plurality of predefined subsets, wherein the selection depends on the determined channel condition.

4. The method of claim 3, wherein the plurality of predefined subsets includes different subsets, each of which is stored in association to disjoined value ranges of the channel condition.

5. The method of claim 1, wherein the channel condition of the wireless communication channel is indicative of at least one of coherence time and the at least one of the delay spread and the Doppler spread.

6. The method of claim 1, wherein a number of the Resource Elements of the subset is increased in a frequency direction and/or a number of the Resource Elements of the subset is decreased in a temporal direction, based on determining that the channel condition for the wireless communication channel indicates at least one of an increase in frequency selectivity, an increase in delay spread, an increase in coherence time and a decrease in Doppler spread.

7. The method of claim 1, wherein a number of the Resource Elements of the subset is increased in a temporal direction and/or a number of the Resource Elements of the subset is decreased in a frequency direction, based on determining that the channel condition for the wireless communication channel indicates at least one of a decrease in frequency selectivity, a decrease in delay spread, a decrease in coherence time and an increase in Doppler spread.

8. The method of claim 1, wherein the Resource Elements, when transmitted, are transmitted in the Resource Block and the subset is a proper subset of the Resource Block so that the subset of the Resource Elements is smaller than an entire set of Resource Elements of the Resource Block.

9. The method of claim 8, wherein the Resource Elements of the subset are distributed in the Resource Block so that a number of the Resource Elements of the subset in a frequency direction is greater than a number of the Resource Elements of the subset in a temporal direction of the Resource Block, based on determining that the channel condition for the wireless communication channel is indicative of high frequency selectivity.

10. The method of claim 8, wherein the Resource Elements of the subset are distributed in the Resource Block so that a number of the Resource Elements of the subset in a temporal direction is greater than a number of the Resource Elements of the subset in a frequency direction of the Resource Block, based on determining that the channel condition for the wireless communication channel is indicative of high Doppler spread.

11. The method of claim 8, wherein the Resource Elements of the subset are uniformly distributed in frequency and time within the Resource Block, based on determining that the channel condition for the wireless communication is indicative of both frequency selectivity and Doppler spread.

12. The method of claim 8, wherein the subset of Resource Elements forms a lattice in frequency and time within the Resource Block.

13. The method of claim 1, wherein a total number of the Resource Elements in the subset is at least substantially independent of the determined channel condition.

14. The method of claim 1, wherein an average ($\phi$) of a direction ($\phi$) between next-neighbor Resource Elements in the subset is closer to a frequency direction than to a temporal direction, based on determining that the channel condition for the wireless communication channel is indicative of high frequency selectivity, and closer to a temporal direction than to a frequency direction, based on determining that the channel condition for the wireless communication channel is indicative of high Doppler spread.

15. The method of claim 1, wherein a number of Resource Elements of the subset in a temporal direction is proportional to the Doppler spread of the wireless communication channel and/or inversely proportional to a coherence time of the wireless communication channel.

16. The method of claim 1, wherein a number of Resource Elements of the subset in a frequency direction is proportional to the delay spread of the wireless communication channel and/or proportional to a coherence time of the wireless communication channel.

17. A computer program product comprising a non-transitory computer readable storage medium storing program code for performing the steps of the method of claim 1 when the program code is executed on a computing device.

18. The method of claim 1, wherein applying an estimation filter to reference signals received on the wireless communication channel estimation filter or to coarse channel estimations based on the reference signals comprises applying an estimation filter to reference signals received on the wireless communication channel.

19. An apparatus comprising a mobile device for performing channel estimation for a wireless communication channel, the apparatus comprising:
  a determining unit adapted to determine a channel condition for the wireless communication channel, wherein the channel condition of the wireless communication channel is indicative of at least one of a delay spread and a Doppler spread of the wireless communication channel;
  a selecting unit adapted to select a subset of Resource Elements of a Resource Block of the wireless communication channel based on the determined channel condition;
  a filtering unit adapted to apply an estimation filter to reference signals received on the wireless communication channel or to coarse channel estimations based on the reference signals by estimating channel coefficients for the subset of Resource Elements of the Resource Block of the wireless communication channel; and
  an interpolating unit adapted to determine channel coefficients for Resource Elements not included in the subset by interpolating the estimated channel coefficients for the subset of Resource Elements.

20. The apparatus of claim 19, further comprising:
  a memory unit adapted to store a plurality of predefined subsets, wherein the subset is retrieved from the memory unit depending on the determined channel condition.

21. The apparatus of claim 19, wherein applying an estimation filter to reference signals received on the wireless communication channel estimation filter or to coarse channel estimations based on the reference signals comprises applying an estimation filter to reference signals received on the wireless communication channel.

* * * * *